Sept. 9, 1952  E. A. WILKENSON ET AL  2,609,729
BOMBING INSTRUMENT FOR AIRCRAFT
Filed Oct. 5, 1949  9 Sheets-Sheet 1

$v = 167$ m/s $= 600$ km/h $= 373$ m.p.h.

Inventors
E. A. Wilkenson
P. T. Faxen

Sept. 9, 1952 E. A. WILKENSON ET AL 2,609,729
BOMBING INSTRUMENT FOR AIRCRAFT
Filed Oct. 5, 1949 9 Sheets-Sheet 4

Inventors
Erik Alvar Wilkenson
Per Torsten Faxén

Sept. 9, 1952 E. A. WILKENSON ET AL 2,609,729
BOMBING INSTRUMENT FOR AIRCRAFT
Filed Oct. 5, 1949 9 Sheets-Sheet 5

Sept. 9, 1952     E. A. WILKENSON ET AL     2,609,729
BOMBING INSTRUMENT FOR AIRCRAFT
Filed Oct. 5, 1949     9 Sheets-Sheet 6
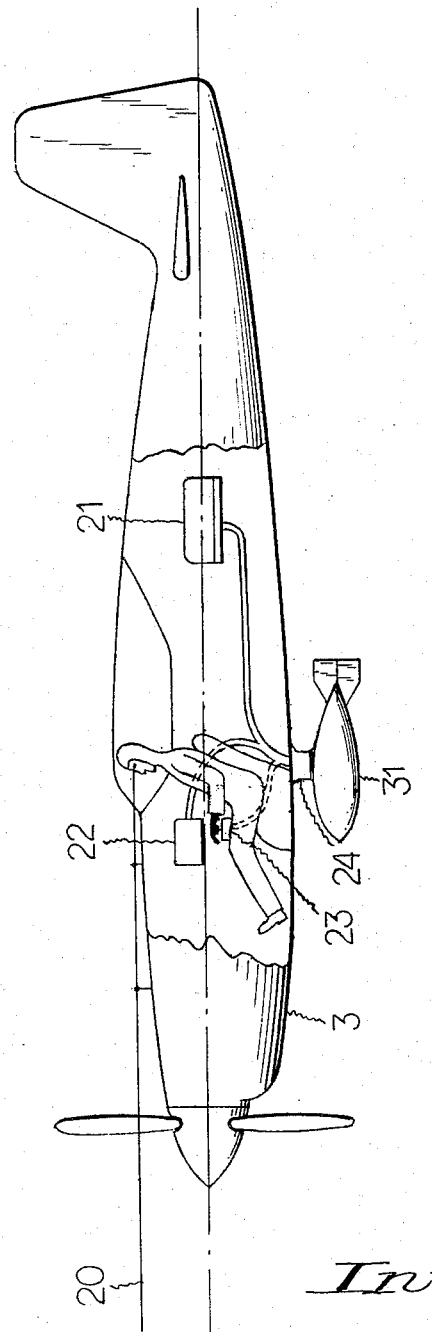

Sept. 9, 1952  E. A. WILKENSON ET AL  2,609,729
BOMBING INSTRUMENT FOR AIRCRAFT
Filed Oct. 5, 1949  9 Sheets-Sheet 7

Inventors
E. A. Wilkenson
P. T. Faxen
By Stevens Downing Tuttle Co
Attys.

Sept. 9, 1952 E. A. WILKENSON ET AL 2,609,729
BOMBING INSTRUMENT FOR AIRCRAFT
Filed Oct. 5, 1949 9 Sheets-Sheet 8

Inventors
E. A. Wilkenson
D. T. Faxen
By Glascock Downing Diebold
Attys.

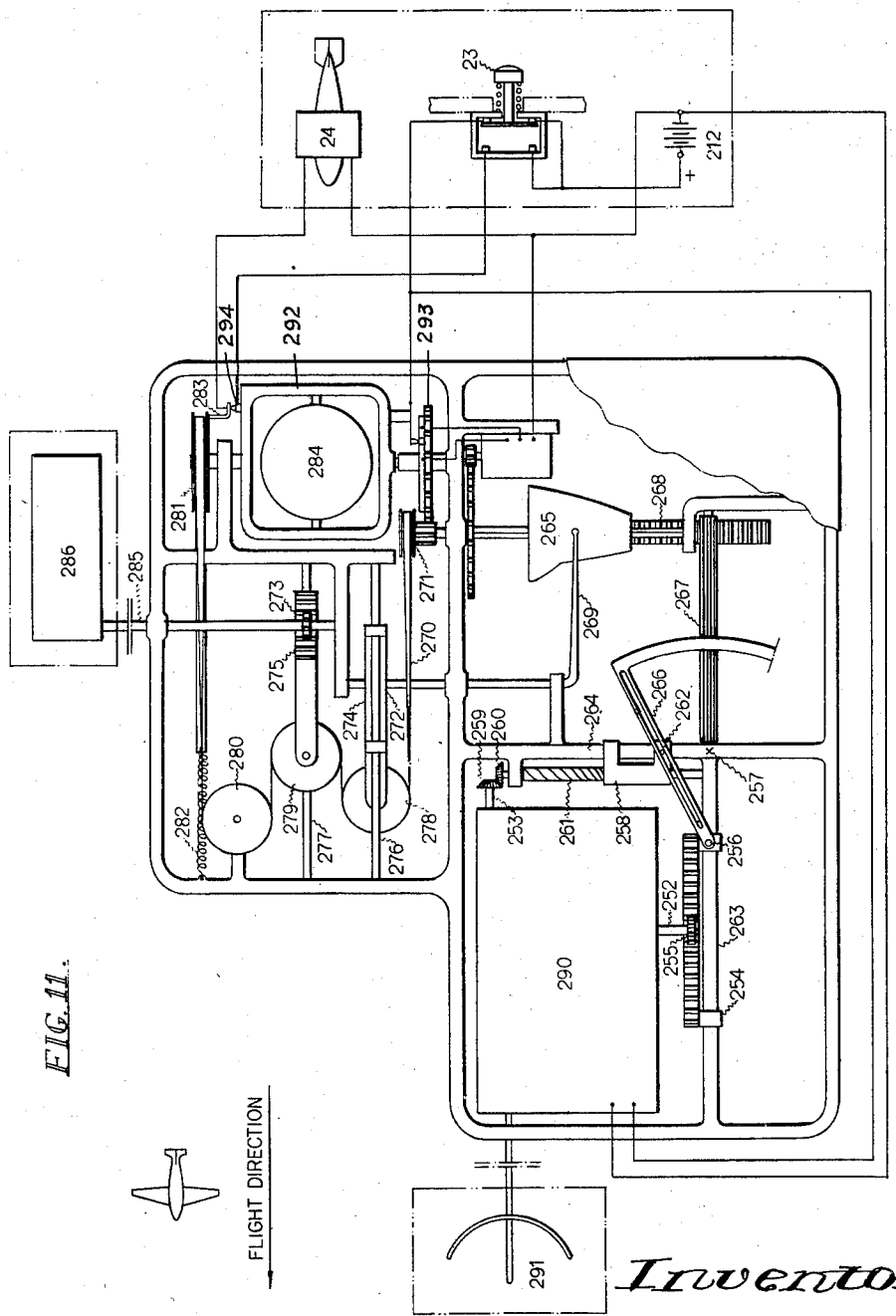

Patented Sept. 9, 1952

2,609,729

UNITED STATES PATENT OFFICE 2,609,729

BOMBING INSTRUMENT FOR AIRCRAFT

Erik Alvar Wilkenson and Per Torsten Faxén, Linkoping, Sweden, assignors to Svenska Aeroplan Aktiebolaget, Linkoping, Sweden, a joint-stock company of Sweden Application October 5, 1949, Serial No. 119,708
In Sweden August 4, 1941

10 Claims. (Cl. 89—1.5)

This invention relates to bombing instruments for aircraft and refers more particularly to a device for use in dive bombing to effect automatic release of a bomb when the several factors involved in the bombing situation bear such a relation to one another that a bomb then released will strike the target.

More particularly, the invention contemplates an apparatus for automatically and continuously ascertaining and/or taking into account all of the major variable elements involved in computing the exact attitude and direction of flight path of a bombing aircraft during the pull-out from a dive in which a fixed optical sight in the aircraft has been aimed on the target; for integrating and correlating that date with manually inserted data relating to known factors which affect the bombing situation; and for automatically effecting release of a bomb at the critical instant in which the aircraft's attitude and flight direction are such as to impart to the bomb a trajectory which will intersect the target.

This application embraces the subject matter of our copending abandoned application, Serial No. 731,164, and comprises a continuation-in-part of our copending application, Serial No. 731,163.

In general, when a bomb or other comparable object is released from an aircraft with the purpose of hitting a given target, there is no initial speed of ejection of the bomb in relation to the aircraft. The bomb and the aircraft have, therefore, the same velocity and direction of motion at the moment of release.

Owing to the force of gravity the path of the falling bomb will be more or less curved in a vertical plane. It follows that the direction of the motion of the bomb, and of the aircraft, at the moment of release, cannot coincide with the aiming line, i. e. the straight line between the target and the aircraft, if a direct hit is to be obtained. The angle $\epsilon$ between the aiming line and the direction which the bomb must have at the instant of release to achieve a hit will be called the angle of divergence in the following text. See Figure 1 of the accompanying drawing, in which 1 is the ground, 2 is a fixed target, and 3 is an aircraft from which a bomb is to be released. At the moment of release of the bomb the aircraft is at the height $h$ above the ground, and is flying with a velocity $v$ in the direction shown by the arrow 4'. At the moment of release, the connecting line 4 from the aircraft to the target makes the angle $\varphi$ with the horizontal plane. The angle between the arrow 4' and the connecting line 4 is the angle of divergence $\epsilon$.

The magnitude of the angle $\epsilon$ necessary for a hit is primarily dependent on the above mentioned factors $h$, $v$ and $\varphi$ or corresponding quantities. Other factors such as wind, temperature and barometric pressure etc., must also be taken into account. As a common term to cover all the variables which influence the angle of divergence, the expression "elements of aim" will be used herein.

The two principal methods which are used for bombing from aircraft are "level bombing" and "dive bombing." As the names imply, the chief difference is that in the former method the aiming and release of the bomb occurs during horizontal flight, and in the latter in a dive. In all cases, however, the bomb must be released when the appropriate value of the divergence angle $\epsilon$ has been attained. This is determined by means of instruments or by judgment.

There are many kinds of bombing devices or bomb sights, and they have in common the object of calculating the correct value of $\epsilon$ with regard to the prevailing elements of aim. These quantities are introduced by manual adjustments, or are automatically measured by special auxiliary instruments. The elements of aim can also be standardized to some extent to certain values, but in that case the bombing device is limited to these values.

Level bombing is more suitable than dive bombing in some cases, and vice versa; as a rule the former method is used for heavy aircraft and the latter for lighter ones. Furthermore, it is is usual that the pilot aims and releases the bomb in the case of dive bombing, while a special bomb aimer relieves the pilot of these duties in level bombing. As the invention which will be dealt with here is a bombing device for use in dive bombing, only that type of bombing will be considered in the following.

There are two well known types of bomb sight in use for dive bombing. In the first type the optical axis of the sight is fixed in the aircraft or is manually adjustable, and in using it the pilot usually has to aim with a certain amount of allowance for divergence, according to estimations of the prevailing elements of aim. In the second type an automatically computing instrument moves the optical axis according to continuous measurements of at least the most important elements of aim, thereby relieving the pilot to some extent.

Dive bombing methods can be divided into different groups, depending on which combinations of elements of aim are used. Previously the two most usual types of dive bombing have been attacks at very low altitudes, and attacks with very steep angles of dive. Common to both methods is the fact that the path of the bomb is relatively straight and the angle of divergence is consequently small.

Fig. 2 is a diagram representing a vertical plane through the target and the aircraft. The origin O corresponds to the target, the vertical axis of the diagram showing the height above the target and the horizontal axis corresponding to horizontal distance from the target. The diagram shows how the angle of divergence $\epsilon$ varies with the height $h$ and angle of dive $\phi$ for a speed $v=373$ M. P. H. (600 km./h.) The angle $\epsilon$ can be obtained for other speeds by using, instead of the actual height, an equivalent height equal to the true height multiplied by the square of the ratio of the speed 373 M. P. H. (600 km./h.) to the true speed. The curves hold good as a close approximation for all typical values of the other elements of aim. It can be seen from the figure that the angle $\epsilon$ increases with increasing height, diminishing speed and diminishing angle of dive.

The areas A and B shown on the diagram mark roughly the regions in which low altitude attack and very steep diving attacks, respectively, are used. It is apparent that both of these methods must be considered as very limited types of dive bombing, their special feature being the small value of the angle $\epsilon$, usually less than about 8°. The chief reason why these special types of attack have been prevalent is simply that they have made it possible to attain a rather good accuracy of hit by the use of simple bomb sights. A theoretical investigation can be made showing that in these two cases a rather low degree of accuracy is satisfactory in the values of the elements of aim, to achieve some arbitrary accuracy o fhit. As might be expected, it proves that for increasing magnitudes of $\epsilon$, greater and greater accuracy is necessary in the determination of the elements of aim and in the evaluation of $\epsilon$ in order to maintain the same accuracy of hit. Owing to the lack of sufficiently accurate devices for this, it has been necessary to accept several disadvantages which are inevitable when dive bombing with small values of $\epsilon$. The greatest of these disadvantages is that the pilot has to fly to a certain narrowly limited position in relation to the target and release the bomb there, on the peril of being shot down by the air defence.

It is possible of course to design bombing devices capable of greater accuracy in determining the angle $\epsilon$ even for high values of $\epsilon$, at the cost of greater complication. This would permit release of the bomb at greater distances from the target, and the elements of aim chosen could be more suitable from the point of view of military tactics and aeronautics. The possibilities of using such an instrument, however, are relatively small as the field of view in most aircraft, and especially those with an engine in front of the pilot, is very limited in the forwards downwards direction, being generally about 8°, or less, from the centre line of the propeller. If more or less arbitrary combinations of the elements of aim are to be used, the angle of divergence required may be considerably greater than 8°, as can be seen from Fig. 2.

It can be said that on the whoile the basic general advantages which should, in principle, belong to dive bombing have not previouly been realised in practise, partly due to the above mentioned practical difficulties. However, there is a special type of dive bombing which changes the situation entirely, namely the method of releasing the bomb during the pull-out from the dive instead of in the dive itself. The method is illustrated in Fig. 3, where the path of the aircraft and the bomb in the vertical plane are shown in diagram form. The numbers have the same significance as in Fig. 1, with the exception of the connecting line 4, which is not drawn to the target from the position of the aircraft at the moment of release (3b) as in the previous case, but is drawn instead from a point (3a) immediately prior to the beginning of the pull-out, where the process of aiming is completed.

Strictly speaking, the angle $\epsilon$ as defined in Fig. 3 for release in the pull-out, differs somewhat from the corresponding angle in Fig. 1, owing to the movement of the aircraft from point 3a to point 3b during the lapse of time between the completion of the aiming and the moment of release of the bomb. However, the effect of this is small and the diagram of $\epsilon$ in Fig. 2 can also be used with good accuracy for release in the pull-out.

During the pull-out the aircraft must at a certain moment attain a direction of motion which makes the desired angle $\epsilon$ with the connecting line 4 necessary to hit the target. At this moment the bomb must be released. To do this the pilot must either judge the necessary amount of pull-out with regard to the prevailing values of the elements of aim, or else have a special bombing instrument which does it for him.

For effective bombing, the rapid rate of change of the elements of aim during the pull-out makes it practically imperative for the pilot to have some kind of bombing instrument, when this method of releasing the bomb during the pull-out is used. Reliance on the capacity of estimation of the pilot has proved mostly to give very poor results in practice.

Such an instrument can be made as a separate unit in the aircraft. A sight is required for directing the aircraft towards the target, before the pull-out. Said sight may have a fixed optical axis, and the sight used for the fixed weapons (guns) can be used for the purpose.

In the looping plane of the aircraft the optical axis of the sight should intersect the eye of the bomb-aimer-pilot and have a direction well above the lower limit of his field of view in the forward-downwards direction. This does not in any way limit the use of values of the angle $\epsilon$ which are considerably larger than the available angle of unobstructed view forwards and downwards.

The accuracy in the lateral direction must also be considered. Laterally, therefore, the optical axis should be parallel to the plane of symmetry of the aircraft, or, more strictly, it should be parallel to the normal line of motion of the aircraft in relation to the surrounding air. If the attack is made in the wind direction or directly against the wind, towards a fixed target, the aim and the pull-out should be made in a fixed vertical plane through the target. Throughout this specification and the claims the term "pull-out" will be understood to refer to a straight-away pull-out, i. e., a pull-out in which the only change of attitude and of direction of motion of the aircraft (relative to its surrounding air) is that which takes place about its lateral axis. An attack made across the wind is somewhat more complicated than one parallel to the wind, but in both cases attainment in practice of a satisfactory degree of accuracy presents no great difficulty.

With a bombing instrument of suitable design, the pull-out method permits very accurate bombing even at long target ranges, because it is not limited to small values of the angle $\epsilon$. If values up to $\epsilon=30°$, for example, are utilized, it will be seen from Fig. 2 how the size of the region around the target increases, from which the bomb can be released.

In some bombing instruments, old in the art, for instance that disclosed in a patent to Morgenthaler et al., Number 2,410,097, the direction of motion of the aircraft is determined by correlated measurements of the speed of the aircraft and the rate of change of its altitude. That expedient obviously gives satisfactory accuracy only as long as said rate of change is small compared with said speed, i. e. for shallow dives (glides). In other bombing instruments, old in the art, the direction of motion is standardized as a function of the time after the start of a pull-out. Such instruments, of course, are limited in their utility and give poor results when employed outside the restricted range of conditions for which they are suited.

By contrast, it is an object of this invention to provide a bombing instrument for use in dive bombing which will automatically release a bomb at the proper point during the pull-out from an aiming dive to achieve a hit on a target aimed at during the dive, and which may be successfully used under widely varying conditions of elements of aim.

Another object of this invention resides in the provision of a bombing instrument for precision bombing in the pull-out of a dive bombing dive, which instrument will automatically determine and correlate all of the significant variable elements of aim during the period from the instant when the bomb-aimer-pilot ascertains that a fixed axis of his aircraft coincides with the line of sight to the target and manually initiates operation of the instrument, to the instant during the pull-out when the bomb must be released to hit the target, at which instant the instrument effects such release.

A further object of this invention resides in the provision of computing instrumentalities for automatically correlating and computing the elements of aim involved in bombing in the pull-out from a dive bombing dive and determining the release point in terms of the attitude and direction and velocity of motion of the bombing aircraft.

Still another object of this invention resides in the provision of a computing device in which three-dimensional cams can be utilized for automatic determination of the point at which a bomb should be released, under the conditions above described, in order for it to hit a target.

Another object of the present invention is to provide improved means for obtaining the aforesaid angle of divergence $\epsilon$, defining the required direction of motion of the aircraft for release of a bomb to hit a target, under any of a wide range and variety of conditions of speed, altitude, dive angle and rate of pull-out.

With the above and other objects in view, which will appear as the description proceeds, this invention resides in the novel construction, combination and arrangement of parts substantially as hereinafter described and more particularly defined by the appended claims, it being understood that such changes in the precise embodiments of the herein disclosed invention may be made as come within the scope of the claims.

The accompanying drawings illustrate several complete examples of the physical embodiments of the invention constructed according to the best modes so far devised for the practical application of the principles thereof, and in which.

Figure 7:
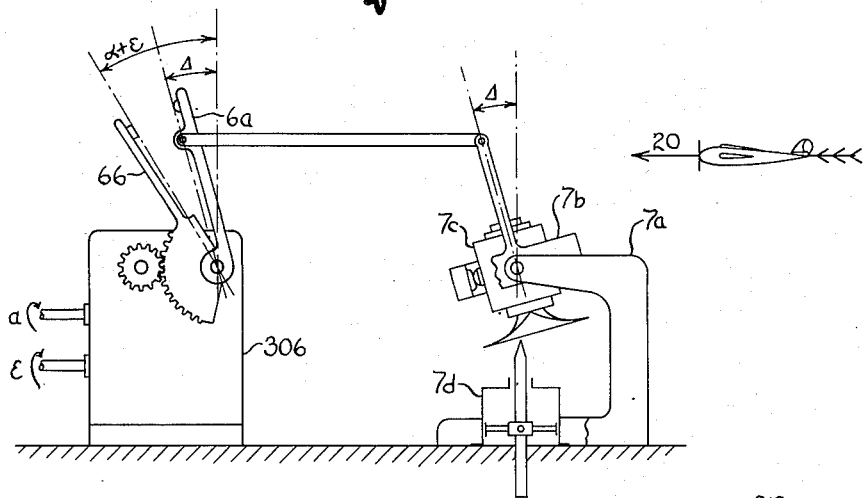

Fig. 7 schematically illustrates an arrangement of the principal components of the bombing instrument.

Fig. 8 is a diagrammatic side view of an aircraft having a bombing instrument according to our invention.

Figure 9:
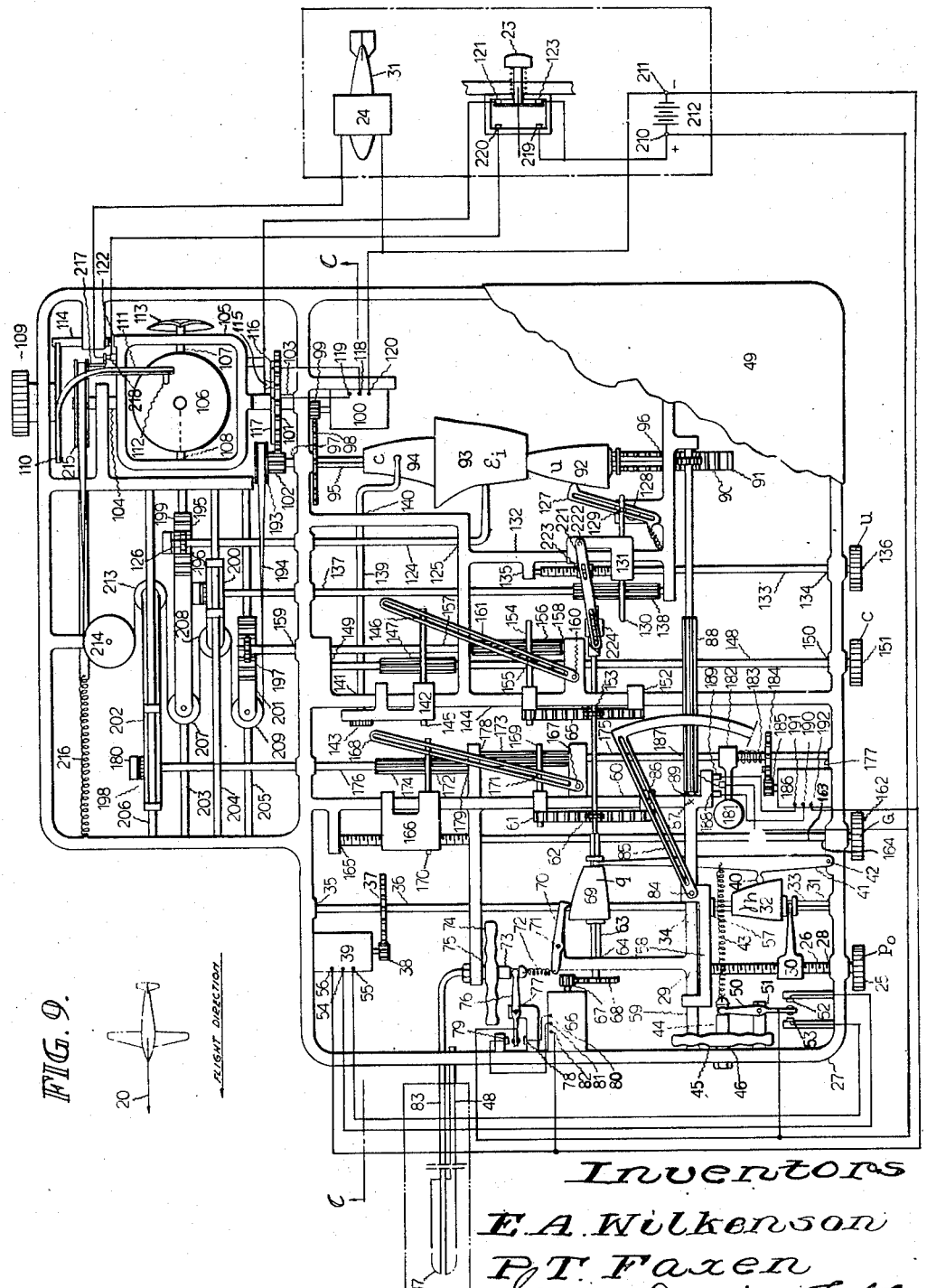

Fig. 9 is a top view of one embodiment of our invention, having a gyroscope for angular references, aneroid means for altitude and speed corrections and an accelerometer for angle of incidence correction.

Figure 10:
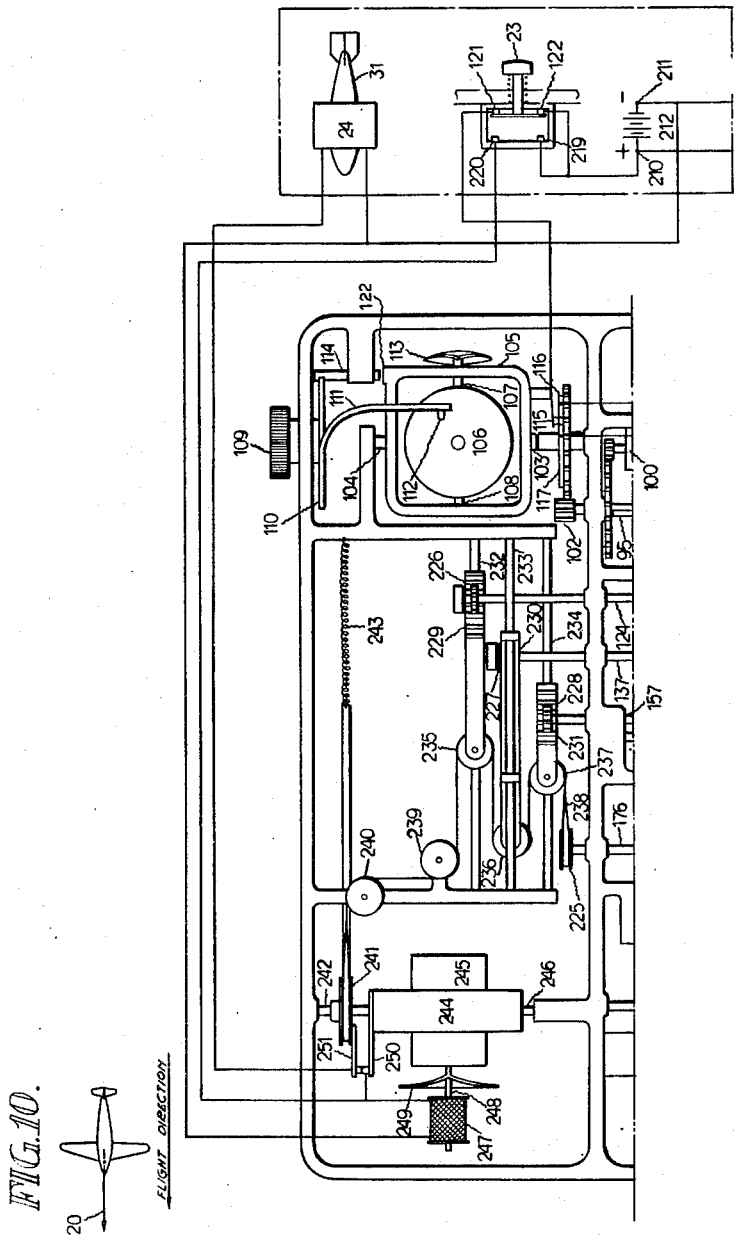

Fig. 10 is a top view illustrating an alternative embodiment of a portion of the instrument of Fig. 9 with two gyroscopes for angular references.

Fig. 11 is a top view of another embodiment of our invention, having a gyroscope for angular references, radar means for slant range and speed corrections and a vane for angle of incidence correction.

In the drawings like reference characters refer to like parts throughout the several views.

The bombing instrument according to the invention, as shown in Fig. 8, consists of a main unit 21, which is completely automatic and may be placed in any part whatever of the aircraft 3, and an auxiliary control unit 22 containing a number of controls, adjusting devices, etc. The auxiliary control unit is intended for manipulation by the pilot, and is connected with the main unit by electrical or other means.

A bombing attack would be made as follows: The aircraft, which has a bomb sight or gun sight with a fixed optical axis 20, is brought into a dive. Maneuvering the aircraft so that the optical axis 20 intersects the target, the pilot presses an actuating button 23. Immediately after this he finishes the dive by means of a normal pull-out. The actuating button actuates the above mentioned main unit of the bombing instrument, which starts working. When the pull-out has advanced to a stage determined by the main unit, an impulse is given automatically to the bomb release mechanism 24 thus releasing the bomb 31. The bombing instrument, the design of which will appear below, corrects for all essential factors and the bomb therefore hits the target.

As will appear hereinafter, one of the essential factors which the instrument employs in effecting its purpose is the position in space of the aircraft relative to the target at the instant the pilot presses the button 23 to initiate the automatic operation of the instrument. The determination of this position necessitates the determination of one of the only two distances measurable from the aircraft by which the position of the aircraft may be related to the target. One of these, altitude, is easily measured by an aneroid, the other, slant range, is measurable by radar. In the embodiment of the invention about to be described the former distance is used, while in the modified embodiment of the invention shown in Figure 11, and which employs radar, the latter distance is used.

Figure 1:
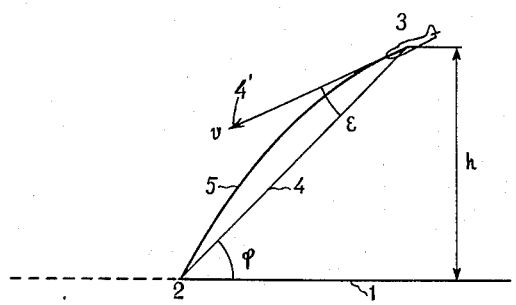
Fig. 1 is a diagrammatic side view of an aircraft in a dive bombing pass and the trajectory of a bomb dropped from the aircraft.
Figure 2:
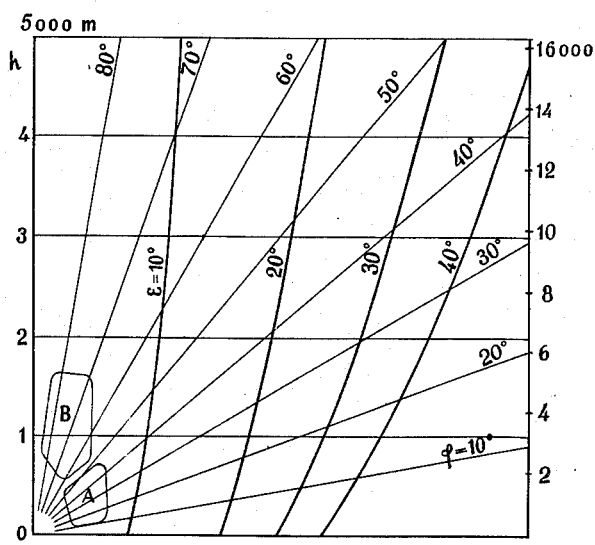
Fig. 2 is a chart showing the angle of divergence $\epsilon$ as a function of the altitude of release of the bomb and the angle of dive for a certain speed of flight of an aircraft.
Figure 3:
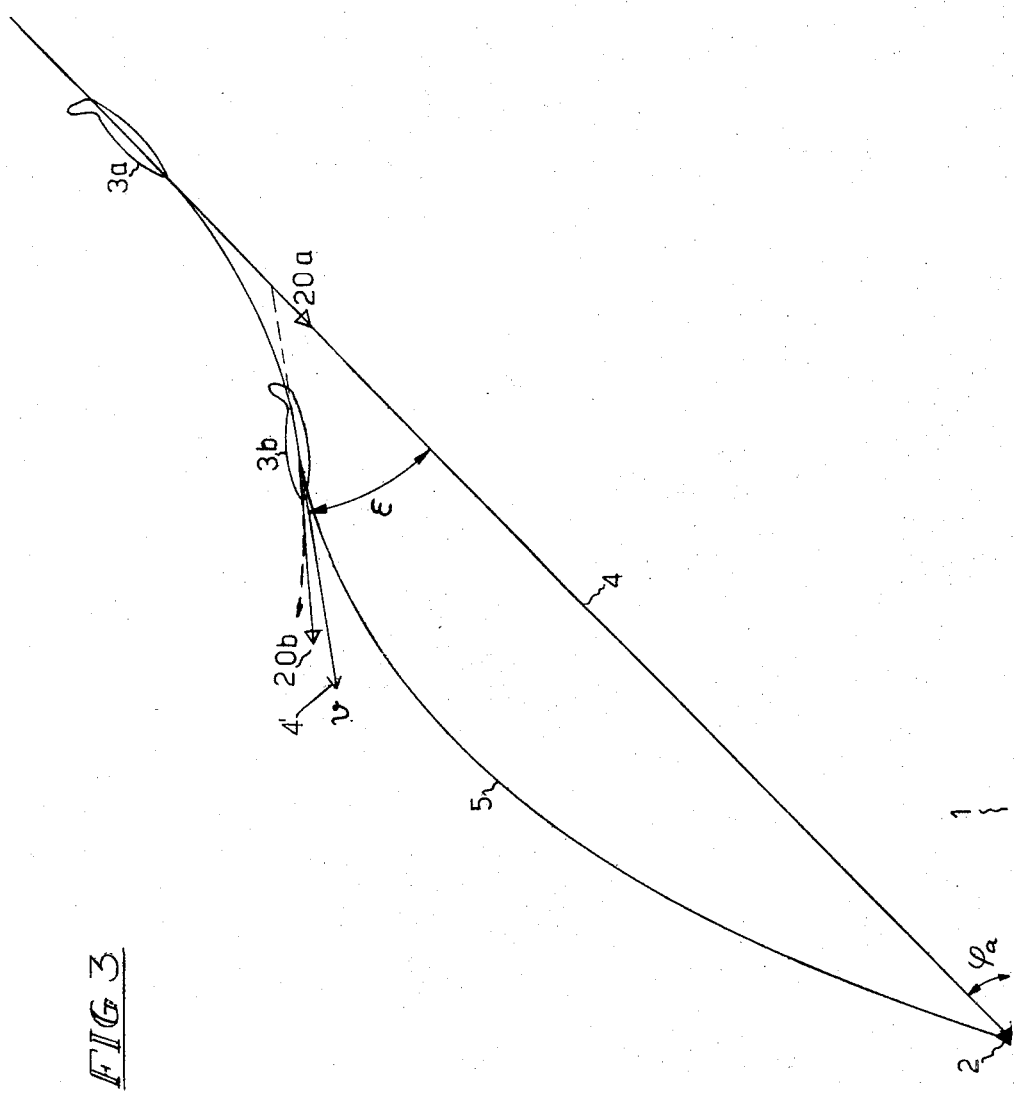
Figs. 3 and 4 are diagrammatic side views of the path of an aircraft and of a bomb, said bomb being released in the pull-out of a dive.
Figure 4:
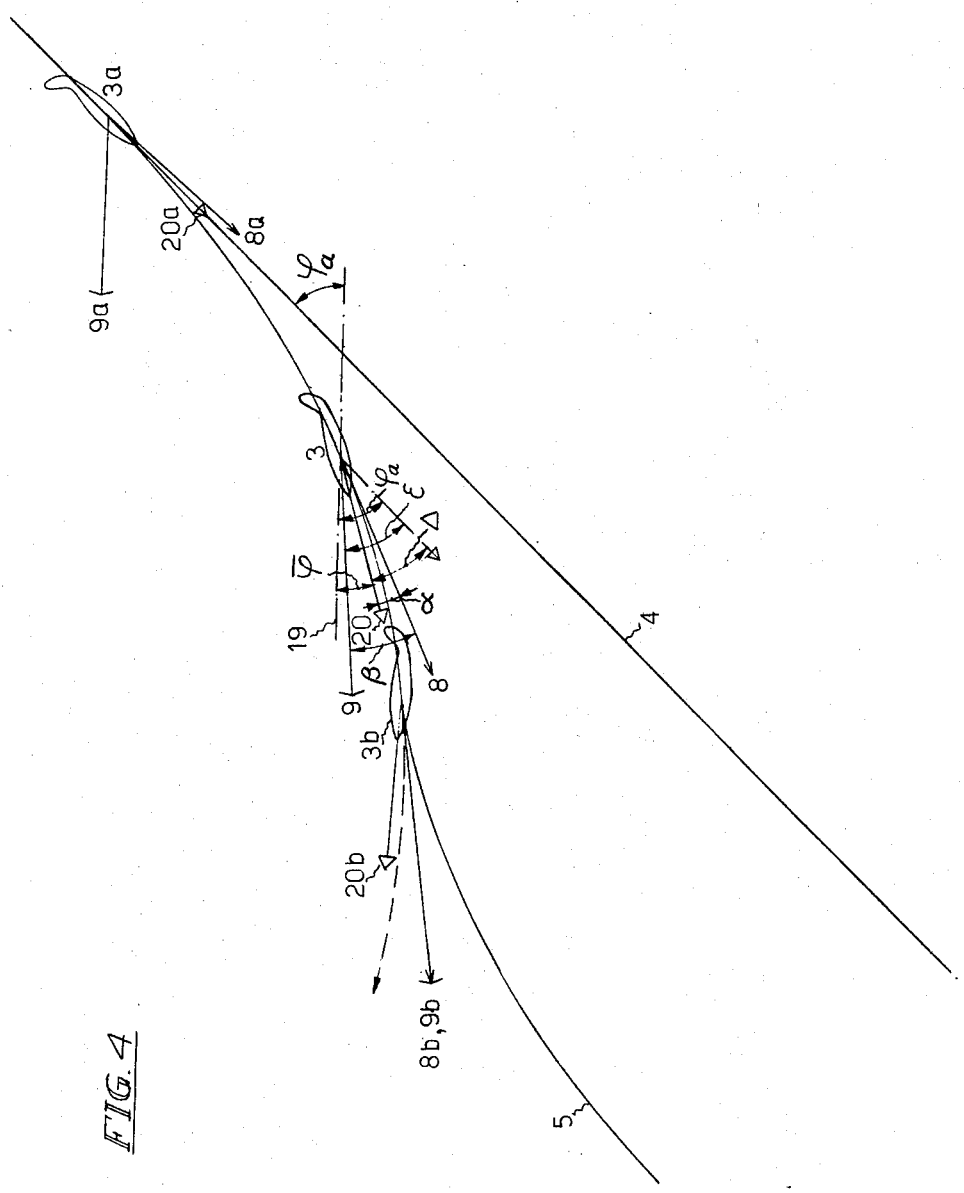

In Fig. 4 the course of a pull-out can be studied. As in Fig. 3 the aircraft is seen in a position $3a$ immediately prior to the start of the pull-out and in a position $3b$ at the moment of release. In addition, a position between said positions is drawn in. The true direction of motion of the aircraft at the instant it occupies each of the three positions shown is represented, respectively, by arrows $8a$, $8$ and $8b$. Further the requisite direction of motion of the aircraft for a bomb released at those respective positions to hit the target is shown by arrows $9a$, $9$ and $9b$. The angle between the true direction of motion and the requisite direction of motion is denoted by $\beta$. It appears from Fig. 4 that the angle $\beta$ is decreasing during the pull-out and in the position $3b$ of the aircraft, where directions $8b$ and $9b$ coincide, $\beta$ is equal to zero. Fig. 4 also shows a part of the bomb path $5$ and the disposition of the optical axis $20a$, $20$ and $20b$ of the sight in the three positions of the aircraft.

If the extension of the optical axis $20$ in the momentary position $20a$ is selected as a fixed datum line in space, and said optical axis is taken as a fixed datum line in the aircraft which, of course, moves therewith, the angles $\Delta$, $a$ and $\epsilon$ in Figure 4 must be ascertained by the instrument. Said symbols are defined as follows, reference being had to Fig. 4, in which $19$ is a horizontal line.

$\Delta$ denotes the angle through which the optical axis $20$ of the sight, said axis being fixed in the aircraft, turns in the vertical plane during the pull-out, measured from the position $20a$ at the moment when the actuating button $23$ is pressed.

$a$ denotes the aerodynamic angle of attack of the aircraft, here taken with reference to the optical axis $20$.

$\epsilon$ denotes the angle, in a vertical plane, between a straight line $4$ through the target and the location $3a$ of the aircraft when the actuating button $23$ is pressed, and the direction of motion $9$, related to the ambient air, which the aircraft, in a pull-out, must have reached at the moment of releasing a bomb, in order that said bomb shall hit the target. (The ambient air must be taken as a reference because the aircraft is flying in it and it is therefore the only feasible source of measurement available to an aircraft in a dive.)

The angle $\epsilon$ depends upon all factors influencing the displacement of the bomb during the pull-out and its free fall. Mathematically this can be written $$\epsilon = f(x_1, x_2, x_3, \ldots) \qquad (i)$$

in which the variables $x_1, x_2, x_3, \ldots$ denote the magnitude of said factors which comprise the elements of aim. The function can be deduced mathematically and evaluated by means of bomb tables, etc.

From Fig. 4 it will be seen that the following equation is satisfied continuously during the pull-out, provided that the optical axis $20$ is pointing towards the target when the actuating button is pressed (lines $4$ and $20a$ coinciding):

$$\epsilon - \beta + a - \Delta = 0$$

where, as mentioned above, $\beta$ denotes the angle between the true direction of motion $8$ and the requisite direction $9$ of the aircraft.

When $\beta = 0$, the release has to be performed. Consequently the instrument has to send out the release impulse when $$\Delta - a - \epsilon = 0 \qquad (ii)$$

The bombing instrument according to our invention is preferably based upon Equations ii and i, in which the angle $\Delta$ is obtained by means of a gimbal suspended gyroscope, the angle $a$ by means of a suitable type of angle of attack meter and the angle $\epsilon$ by means of at least one three dimensional cam moving in dependence on the variables $x_1, x_2, x_3, \ldots$ . Further, the following equation is continuously computed during the pull-out, by the total calculator $$\beta = \epsilon + a - \Delta \qquad (iii)$$

During the pull-out the direction $8$ in Fig. 4 is rapidly varying in contrast to the direction $9$, as can easily be seen. (Normally the variation of direction $9$ is smaller than shown.) In other words the angle $\epsilon$ is fairly constant while the angle $\Delta - a$ is rapidly increasing. As a result special and severe demands are put on the determination of $\Delta - a$.

It is a well known fact that extremely accurate results, free from time lag, can be obtained when a gimbal suspended gyroscope is used as a fixed reference for measuring angular movements, even in aircraft, where disturbances such as vibration, temperature variations and other unfavourable factors are present. Considering that the variation of the angle $a$ during the pull-out normally is much less than that of the angle $\Delta$, the use of a gyroscope for said purpose therefore means that the main part of the quantity sought is given with very little error. This in turn makes effective bombing possible even from very long target ranges.

Figure 5:
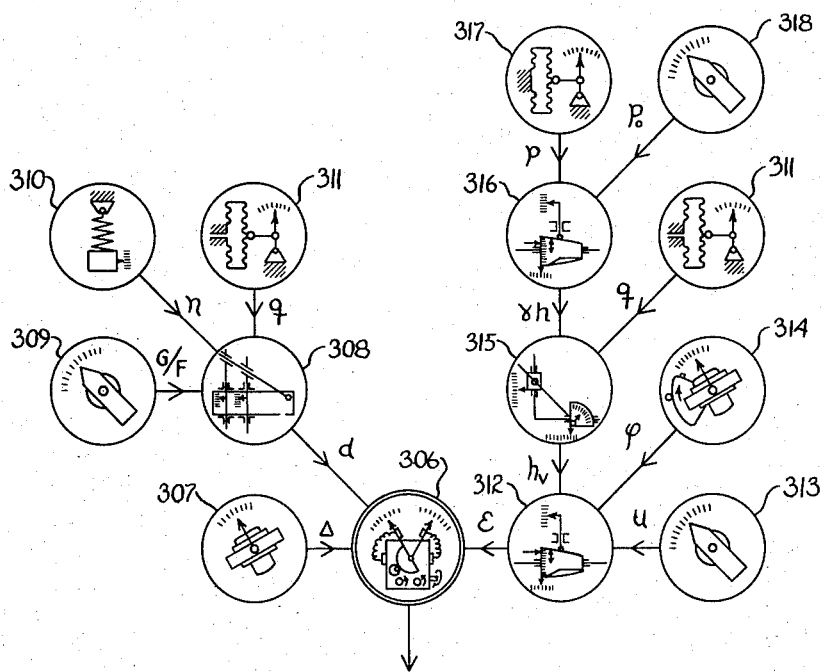
Fig. 5 is a schematic block diagram showing the interrelation of the principal components of the bombing instrument of this invention and the general manner in which the several elements of aim are measured and integrated.

In the embodiment of the bombing instrument according to our invention, diagrammatically represented in Fig. 5, wherein the altitude of the aircraft is the distance used to determine the position in space of the aircraft relative to the target at the instant the pilot initiates automatic operation of the instrument, the following elements of aim are chosen as variables $x_1, x_2, x_3, \ldots$ in the function $(i)$:

$\varphi_a$ = the angle between the horizontal plane and a straight line through the target and the aircraft before the pull-out,
$h$ = altitude of the aircraft above the target,
$v$ = true air speed of the aircraft,
$u$ = speed of the head wind component (pos. or neg.), or, if the target is moving, the horizontal projection, in a vertical plane through the aforesaid optical axis $20a$, of the target's speed in relation to the air surrounding the aircraft,
$c$ = bomb resistance coefficient ($c = 0$ means no drag).

Neglecting other influencing variables, as being of minor importance, the function (i) gets the form $$\epsilon = f(\varphi_a, h, v, u, c) \quad (iv)$$

For deducing the function (iv) the formula for $\epsilon$ will first be given in the particular case where $$u = c = 0$$

i. e. an ideal case is assumed, where the influence of wind and air resistance are neglected. The "ideal" angle of divergence $\epsilon_i$ is given by the following equation $$2gh/v^2 - \frac{2(1-\cos \epsilon_i)}{n_c \cos \varphi_a} = \frac{\sin 2(\varphi_a - \epsilon_i)}{\cot \varphi_a}\left[\sqrt{1+\frac{2gh/v^2}{\sin^2(\varphi_a - \epsilon_i)}} - 1\right]$$

where $g$ = acceleration of gravity
$n_c$ = average centrifugal acceleration during the pull-out Obviously the angle $\epsilon_i$ can be written $$\epsilon_i = f_0(\varphi_a, Y) \quad (v)$$

where $$Y = \frac{2gh}{v^2} \quad (vi)$$

and $f_0$ is a definite function of only two variables, viz. $\varphi_a$ and $Y$.

The realistic formula of $\epsilon$ can be put in the form $$\epsilon = \epsilon_i + c\frac{\delta\epsilon}{\delta c} + u\frac{\delta\epsilon}{\delta u}$$

By mathematical treatment of the formulae it can be shown that the partial derivatives can be expressed with very good accuracy in the forms $$\frac{\delta\epsilon}{\delta c} = qf_1(\varphi_a, Y)$$

$$\frac{\delta\epsilon}{\delta u} = \frac{1}{v}f_2(\varphi_a, Y)$$

where $q = \frac{\gamma}{2g}v^2$ = dynamic pressure of the air at the prevailing airspeed
$\gamma$ = the specific weight of same air, and
$f_1$ and $f_2$ are definite functions of two variables, viz. $\varphi_a$ and $Y$, which can be determined by means of bomb resistance laws.

Put $$\delta_c = cqf_1(\varphi_a, Y) \quad (vii)$$

$$\delta_u = \frac{u}{v}f_2(\varphi_a, Y) \quad (viii)$$

Thus $$\epsilon = \epsilon_i + \delta_c + \delta_u \quad (ix)$$

Using the quantity $q$ the following relation is also obtained $$Y = \frac{\gamma h}{q} \quad (x)$$

This relation (x) enables the use of an accurate and relatively simple method for determining the quantity $Y$, based on pneumatic measurements. Thus one embodiment of the instrument is designed according to said relation and assumes that the static pressure $p$ and the impact pressure $q_c$ are available in the aircraft. Said pressures can be obtained from a Pitot static tube installed in the aircraft, which may be the same as that normally existing in every aircraft.

The following relationships exist $$\gamma h = \frac{p}{Ra}\left[\left(\frac{p_0}{p}\right)^{Ra} - 1\right] \quad (xi)$$

$$q = \frac{p}{(\chi-1)/\chi}\left[\left(\frac{p+q_c}{p}\right)^{(\chi-1)/\chi} - 1\right] \quad (xii)$$

where $R$ = gas constant of air
$a$ = temperature gradient of the atmosphere (assumed constant in standard atmosphere)
$p$ = static pressure at the level $h$
$p_0$ = static pressure at the level, where $h=0$ (level of target)
$q_c$ = impact pressure (total pressure minus static pressure)
$\chi$ = the ratio of specific heat at constant pressure to specific heat at constant volume for air.

It should be noted from Equations xi and xii that the quantities $\gamma h$ and $q$ (in contrast to the altitude $h$ and speed $v$ themselves) are both independent of the temperature T of the air. Further the influence of the temperature gradient $a$ is slight. By using $\gamma h$ and $q$, therefore, no devices for temperature correction are necessary.

The angle of attack $a$ in Equation iii is calculated in accordance with the following aerodynamic formula:

$$\alpha = \frac{(G/F)n}{bq} + \alpha_s \quad (xiii)$$

where $G$ = gross weight of the aircraft,
$F$ = wing area,
$n$ = load factor = the acceleration of the aircraft perpendicular to its supporting surfaces, including the component of gravity, expressed as a multiple of $g$
$b$ and $\alpha_s$ = constants The gyroscope angle $\Delta$ in Equation iii can be expressed as $$\Delta = \phi_a - \overline{\phi} \quad (xiv)$$

where, as shown in Fig. 4

$\overline{\phi}$ = the angle between the optical axis 20 of the sight and the horizontal plane, said angle being equal to $\phi_a$ when aiming at the target.

Thus, from Equations iii, ix and xiv:

$$\beta = \overline{\phi} - \phi_a + \alpha + \epsilon_i + \delta_c + \delta_u \quad (xv)$$

Referring now to Figure 5 for a schematic diagram of the instrument, by which the several operations performed thereby may be readily visualized in their relation to one another, each circle represents a component element of the instrument, such as a measuring device, a computing device, a control device, or some other calibrated unit, and the lines joining the circles represent the transmissions between the elements or, in other words, the ouputs of the elements from which the lines extend and the inputs to the elements toward which they extend. All of the component parts of the instrument, with the exception of those control devices which must be manually adjusted, work automatically, and when the output result from some one kind of unit or element (e. g., a gyroscope) is required in several places in the instrument, the corresponding symbol is repeated at the corresponding places in the figure.

The wing loading of the aircraft $G/F$ is assumed to be known and is introduced into the instrument by a manual control 309 which is preferably graduated in weight units. The acceleration $n$ is detected and measured by an accelerometer 310 and the dynamic air pressure $q$ is a manometer 311 which is pneumatically connected with the Pitot-static tube of the aircraft. The outputs of the accelerometer and of the manometer are respectively fed into a calculator 308, the output of which is modified by the wing loading setting on the control knob 309. The operation of this calculator will presently be described in detail; suffice it to say at this point that its output is a function of the G, $n$ and $q$ inputs just described and is thus a function of the angle of attack $\alpha$.

The angle of divergence $\epsilon$ is obtained or evaluated by a calculating mechanism 312 according to $\epsilon = f(\phi, h, v, u)$. Thus the angle of dive $\phi$, the height of release $h$, the velocity of flight $v$, and the wind speed $u$ at the release altitude are taken as significant variables and the other elements of aim are either neglected, assumed to be constant, or standardized as functions of the variables mentioned. Using the Formula vi it is possible to consistently relate the altitude $h$ and the speed $v$ to yield a nondimensional coefficient, $$\frac{2gh}{v^2} = Y$$

The static pressure $p$ at the aircraft altitude $h$ is detected by means of a manometer 317 pneumatically connected with the Pitot-static tube of the aircraft and the static pressure $p_0$ existing at the level of the target is set into the instrument by means of a manual control 318. The calculating device 316, into which the outputs of the manual static pressure control 318 and automatic static pressure detector 317 are fed, produces an output proportional to a function of $\gamma h$, in accordance with the Formula xi, $\gamma h = f(p, p_0)$. The output of this computation is fed into another computer 315, along with an output which is a function of the dynamic pressure $q$ as detected by the manometer 311, and the output of this computer 315 is in turn fed into another computer 312, along with the output of a gyroscope 314 (erected and uncaged in level flight) which measures the variable $\phi$, the angle of dive at the instant the pilot presses the actuating button.

The resultant computed by the device 312 is modified by means of a manual control 313 which is adjusted in accordance with prevailing wind conditions. The angle $\Delta$ is measured by means of another gyroscope 307 (unchanged when the pilot presses the actuating button); and since the resultant computed by the calculator 312 corresponds to a function of $\epsilon$ and the resultant computed by the calculator 308 corresponds to a function of $\alpha$, the three outputs (namely, that from the gyroscope 307 corresponding to $\Delta$, the $\alpha$ output and the $\epsilon$ output) may be fed into an adding and substracting or differentiating device 306 so that a release impulse is generated when the condition $\beta = \epsilon + \alpha - \Delta = 0$ is satisfied.

This differentiating mechanism is represented in Figure 7, in which the output of the computer 306 is assumed to actuate an arm 6b through an angle corresponding to $\alpha + \epsilon$, while a gyroscope 7c is mounted in gimbals 7b on a frame 7a fixed with respect to the aircraft and adapted to be uncaged by mechanism 7d actuated by the release button. The gimbals 7b actuate an arm 6a, coaxial with the arm 6b, through a linkage. It will be seen that when the arm 6b has swung through an arc corresponding to $\alpha + \epsilon$ and the arm 6a has swung through an arc $\Delta$, the two arms are brought into coincidence and a contact between them may be established whereby a bomb may be released.

Figure 6:
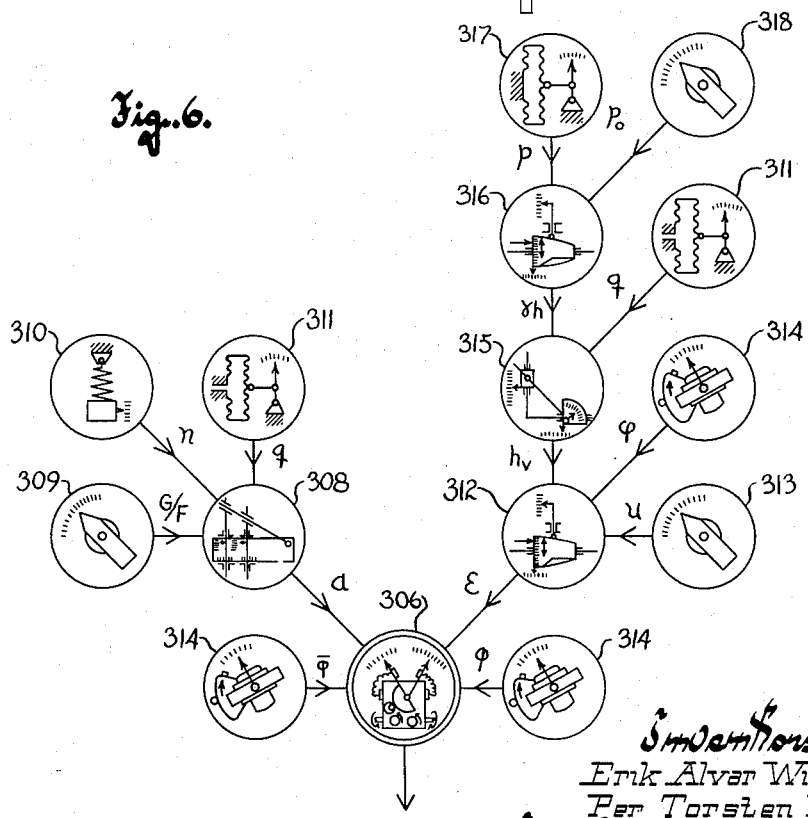
Fig. 6 is a schematic block diagram, similar to Fig. 5 but representing a modified embodiment of the invention.

In the modified embodiment of the instrument of this invention schematically represented in Figure 6, only one gyroscope 314 is employed, but it performs three functions, and is therefore represented in three places in the figure. In this embodiment the horizontal is used as a reference datum line, rather than the sighting line, so that the angle $\overline{\phi}$ which the sighting line makes with the horizontal must be continuously taken into account. In this instance $\overline{\phi} = \phi$ at the moment of pressing the button and the condition $$\overline{\phi} + \alpha = \phi - \epsilon$$

must be satisfied at the instant of bomb release.

The angular position $\phi$ of the gyroscope at the moment of aiming (i. e., at the moment the button is pressed) is first transmitted directly to the release impulse mechanism 306. The gyroscope also transmits to the calculator 312 an output proportional to a function of $\phi$, as in the Fig. 5 embodiment, for determining the angle $\epsilon$, and continuously transmits the value of $\overline{\phi}$ to the impulse mechanism during the pull-out.

The release impulse mechanism 306 may consist of an adding and subtracting mechanism, as in the Fig. 5 embodiment, with two contacts which complete an electric circuit when the above equation is satisfied. In that case, however, an extra differential is needed, since the number of terms in the equation is now four instead of three.

With the foregoing as an outline of the operations performed by the instrument of this invention, a detailed description will now be given of specific devices wherein the principles of the invention may be carried out, beginning with an instrument which corresponds to that diagrammed in Fig. 6.

In the instrument shown in Figs. 6 and 9 the calculation of $\beta$ follows the pattern below:

Quantities in the instrument

I Manually set:
Quantities $p_0$, G, $c$, $u$, gyroscope datum setting presumed known.

II Measured in the instrument:

| Quantities | $p, q_c$ | $\varphi_a, \overline{\varphi}$ | $n$ |
|---|---|---|---|
| Measured by | aneroids | gyroscope | accelerometer |

III Calculated in the instrument by calculating mechanisms:

| Quantities | $h$ | $q$ | $Y$ | $\epsilon_i$ | $\delta_a$ | $\delta_o$ | $\alpha$ | $\beta$ |
|---|---|---|---|---|---|---|---|---|
| According to equation | xi | xii | x | v | viii | | vi | xii | xv |

1. The $\gamma h$-mechanism

The known static pressure $p_0$ at the level of the target is set in the bombing instrument by the bomb aimer by means of a graduated knob 25. Said knob thereby turns a screw 26 carried in bearings 28, 29 in the base 27 of the instrument. As the screw 26 turns a nut 30 carried thereon is displaced axially. A square shaft 33 is rotatably carried in bearings 31, 34 and 35 in the base of the instrument and a three-dimensional cam 32 (the $\gamma h$ cam) is mounted on the square shaft for rotation therewith and for axial sliding motion therealong. The $\gamma h$ cam 32 is moved axially in relation to the pressure $p_0$ by means of a driver attached to said nut 30.

On an extension 36 of said square shaft 33 there is a gear wheel 37, coaxially attached, which meshes with a gear wheel 38 attached to the shaft of an electric motor 39. A cam follower 40 on a feeler arm 41 contacts the surface of the $\gamma h$ cam 32, said feeler arm being pivotally mounted on a pin 42 attached to the base of the instrument so that said cam follower 40 can swing in a plane through the center line of the square shaft 33. A tension spring 43 is connected to said feeler arm 41 and to a pin 44 attached to the center of one side of an aneroid 45. The other side of said aneroid is rigidly secured to the base of the instrument by means of a pin 46. The aneroid 45, which is exhausted of air, is actuated by the pressure of the air surrounding the aneroid. Said pressure is kept equal to the static pressure $p$ by a conduit 48 from the Pitot static tube 47 to the interior of the instrument and the inside of the instrument is isolated from its surroundings by an airtight cover 49, said cover being shown mostly cut away in Fig. 9.

As the static pressure varies the pin 44 is displaced, said pin thereby moving one end of a contact arm 50 which is pivotally mounted on a pin 51 attached to the base of the instrument. Small movements of the contact arm cause its other end to swing into engagement with one or the other of two electrical contacts 52 and 53 attached to the base of the instrument. The contact arm 50 is connected to the positive terminal 210 of a source of current 212 in the aircraft and the contacts 52 and 53 are connected to the terminals 54 and 55 of a reversible motor 39. Said motor is provided with a third terminal 56 connected to the negative terminal 211 of the source of current 212. The reversible motor 39 is so designed that it rotates in one direction when there is a difference of voltage between the terminals 54 and 56 and in the other direction when there is a difference of voltage between the terminals 55 and 56.

If it is assumed that the altitude of the aircraft is decreasing, the static pressure actuating the aneroid 45 will displace the pin 44 towards the aneroid 45. As a result the contact arm 50 will engage with the contact 52, thereby closing the circuit to the terminal 54 on the motor 39. The motor now starts to rotate in one direction, thereby turning the three-dimensional cam 32. The cam 32 is of such shape that its turning causes the feeler arm 41 to stretch the spring 43 until the spring force overcomes the influence of the increased static pressure and the pin 44 returns to its zero position wherein the circuit through the contact arm 50 and the contact 52 is broken and the motor 39 stops. This course of events will be repeated as long as the altitude is decreasing, thereby keeping the stretching of the spring 43 in correspondence to the static pressure $p$. Conversely, as the altitude of the aircraft increases the spring 43 will slack in a corresponding way, keeping the balance between the aneroid and the spring by means of a cycle of events the reverse of that just described and involving the contact 53.

The setting of a pressure $p_0$ by means of the knob 25 together with the pressure $p$ actuating the aneroid 45 determines the angle through which the $\gamma h$ cam 32 must be turned to cause the contact arm 50 to arrive at a position in which it does not contact either contact 52 or 53. It is evident that it is possible to give said $\gamma h$ cam such a shape that its turning angle is proportional to a desired function of the variables $p_0$ and $p$. In the instrument the shape of the $\gamma h$ cam is so calculated and manufactured that said angle is proportional to the magnitude of $\gamma h$ in Equation xi.

Coaxial with and attached to the square shaft 33 there is a gear wheel 57 meshing with a rack formed on the under side of a slide 58. Said slide 58 (the $\gamma h$ slide) is endwise movable along a guide 59 attached to the base of the instrument so that the displacement of the $\gamma h$ slide will be proportional to the magnitude $\gamma h$.

2. *The q-mechanism*

Another guide 60 is attached to the base of the instrument at a right angle to the guide 59 and along it another slide 61 is movable. The upper side of said slide 61 is formed as a rack which meshes with a gear wheel 62 coaxially attached to a square shaft 63 carried in bearings 64 and 65 in base of the instrument. An electric motor 66 turns said square shaft 63 by means of gear wheels 67 and 68. Slidably but non rotatably mounted on the square shaft 63 is a three-dimensional cam 69, the $q$ cam.

The axial displacement of the $q$ cam depends on the movement of the feeler arm 41, the free end of which is drivingly connected with the $q$ cam. A feeler arm 70, pivotally mounted on a pin 71 fixed in the base of the instrument, contacts the surface of the $q$ cam 69. One end of a tension spring 72 is connected to the feeler arm 70 and its other end is connected to a pin 73 which is attached to the center of one side on an aneroid 74, the other side of said aneroid being attached to the base of the instrument by means of a pin 75. One end of said pin 73 is connected with one end of a contact arm 76, said contact arm being pivotally mounted on a pin 77 attached to the base of the instrument. A small displacement of said contact arm 76 will swing it into engagement with one of two contacts 78 and 79, attached to the base of the instrument, said contacts being connected to the terminals 80 and 81 respectively of an electric motor 66, while the contact arm 76 is connected to the positive terminal 210 of the source of current 212. The third terminal 82 of the motor 66 is connected to the negative terminal 211 of the source of current. The total head pressure from the Pitot static tube 47 is communicated via the conduit 83 and a bore in the pin 75 with which the conduit communicates, to the interior of the aneroid 74. Because said aneroid has the total head pressure imposed upon its interior, while only the static pressure is imposed upon its exterior, the aneroid will be actuated by the difference between said two pressures, i. e. the impact pressure.

As the impact pressure varies the $q$ cam 69 will constantly be turned to positions in which the contact arm 76 will be centered between the contacts 78 and 79. Thus the function of this system electro-mechanically corresponds with the function of the $\gamma h$-mechanism described above under 1. The turning angle of the $q$ cam 69 thus depends on two variables, namely the impact pressure $q_c$ and the displacement of the feeler arm 41, which displacement depends upon the pressure $p$, as described above; hence the turning angle of the $q$ cam 69 will be a function of the magnitudes $q_c$ and $p$ as variables, and because the $q$ cam has been shaped in accordance with the Formula xii, its turning angle, and consequently the longitudinal position of the slide 61 which it actuates, will be proportional to the magnitude $q$.

3. The Y-mechanism

An arm 85 is swingably journaled on a pin 84 attached to the slide 58 belonging to the $\gamma h$-mechanism. Said arm 85 has a longitudinal slot along which a pin 86 attached to the slide 61 is movable. The extension of the center line of said slot intersects the center line of the pin 84. Upon displacement of the slide 58 or the slide 61, the arm 85 will swing thereby varying the angle between the center line of the guide 59 and the slot of the arm 85. The position 87 which the center of the pin 84 has when the magnitude of said angle is equal to 90° is marked by a cross. The ratio between the gear wheel 57 and the rack portion of the slide 58 is so selected that the distance between said cross 87 and the center of said pin 84 is equal to the magnitude $\gamma h$ multiplied by a constant factor. Further, the ratio between the gear wheel 62 and the rack of the slide 61 is so selected that the distance between the cross 87 and the center of the pin 86 is equal to the magnitude $q$ multiplied by a constant factor. It will thus be seen that the arm 85 will be swung through an angle which depends upon the magnitude Y in accordance with the Equation x. The arm 85 has a gear sector (in Fig. 9 shown partly cut away) which meshes with a gear cylinder 88 and is movable axially along said gear cylinder 88. Said gear cylinder 88 is rotatable in bearings 89 and 90 in the base of the instrument, and a gear coaxial therewith meshes with a rack 91. A driver at one end of the rack 91 transmits longitudinal movements of said rack to three three-dimensional cams 92, 93 and 94 which are slidably but nonrotatably mounted on a square shaft 95 carried in bearings 96 and 97 in the base of the instrument, so that the three cams rotate in unison with the shaft.

4. The $\varphi$-apparatus

Coaxially attached to said squared shaft 95 is a gear wheel 98 which meshes with a gear wheel 99 attached to the shaft of an electrical motor 100 so that the three cams 92, 93 and 94 are rotated by the motor. A gear wheel 102 is secured to the shaft to be turned thereby, said gear wheel meshing with another gear wheel 101 journaled on a pin 103 attached to the base of the instrument. The gimbal 105 of a gyroscope is also journaled on said pin 103 and on another pin 104 coaxial with the pin 103. The rotor casing 106 of said gyroscope is journaled in the gimbal by means of two shaft pivots 107 and 108 attached to the rotor casing, said shaft pivots being arranged with their axis at a right angle to the pins 103 and 104. The axis of the rotor in said rotor casing is disposed at a right angle to the pins 107 and 108.

The gyroscope 105—106 is arranged to be caged by means of a caging device, comprising a knob 109 carried in bearings in the base of the instrument coaxially with the pins 103 and 104. Said knob 109 is provided with a flange 110 and an arm 111 at the end of which there is a pin 112. A heart-shaped cam 113 is attached to and turns with said shaft pivot 107 of the rotor casing 106. The knob 109 together with the flange 110 and the arm 111 are also axially displaceable. Axial displacement of the knob actuates another pin 114, which is axially slidable in the base of the instrument and has a recess for the flange 110. Caging of the gyroscope by means of the caging device fixes the axis of the gyroscope rotor with respect to the instrument. To cage the gyroscope the knob 109 is pressed and turned counterclockwise. This causes the pin 112 to engage the cam 113, thereby driving said gimbal 105 until the gimbal is stopped by the pin 114, said pin having been pushed into the path of a shoulder 122 on the gimbal. Further turning of the knob 109 will turn the cam 113 and the rotor casing 106 will follow said turning until the pin 112 arrives at the bottom of said cam 113, and the gyroscope is thus caged. By means of an operation in the opposite direction the gyroscope will be uncaged.

Attached to the gimbal 105 there is a resilient contact arm 115 arranged to make brushing contact with either of two semi-circular contact bars 116 and 117 mounted on the gear wheel 101. Said two contact bars are arranged in a circle, the axis of which coincides with the center line of said gear wheel 101, but they are separated from each other by two narrow slots. The contact bars 116 and 117 are connected to the terminals 118 and 119 respectively of the electric motor 100. A third terminal 120 on this motor is connected to the negative terminal 211 of the source of current 212. The resilient contact 115 is connected to the terminal 121 of an actuating button 23 mounted in the aircraft. Said actuating button is of such a design that when it is in rest position the terminal 121 is connected to the terminal 123 which is in turn connected to the positive terminal 210 of the source of current 212.

As long as said actuating button 23 is in rest position, the electric motor 100 will by means of the mechanism described above, automatically turn said gear wheel 101 to cause it to follow the turning of the gimbal 105 and such rotational movement is also imparted to the three-dimensional cams 92, 93 and 94.

By means of the knob 109 the bomb-aimer-pilot has to uncage the gyroscope before the dive and at a moment when the aircraft is flying with its axes directed in such a way that the rotor axis of the gyroscope is vertical. If the instrument is mounted in the aircraft in such a manner that the rotor axis of the gyroscope, when caged, is perpendicular to the optical axis of the bomb sight and a line through the wing tips, the uncaging has to be done when aiming at the horizon with the wing tips level. After this, the rotor axis of the gyroscope will keep its vertical position, and the gimbal 105 will swing through an angle equal to $\varphi$ in relation to the base of the instrument, on the assumption that the wing tips are in level. By means of the mechanism described above the three-dimensional cams 92, 93 and 94 will be turned an angle proportional to the angle $\varphi_a$ if the actuating button is pressed in the moment of aiming at the target, and they will remain in that angular position so long as the button is depressed.

5. The $\alpha$-mechanism

Attached to a shaft 124 there is a feeler arm contacting the surface of the three-dimensional cam 93 (the $\alpha$ cam). Said shaft is rotatable in bearings 125 and 126 in the base of the bombing instrument. The turning of said shaft will be a function of the axial displacement of the $\alpha$ cam 93 and the turning movement of said cam which two motions, as hereinafter brought out, are functions of the magnitudes Y and $\varphi_a$ respectively. Furthermore the shape of the $e_1$ cam 93 is such that the turning angle of said shaft 124 will be proportional to the value $e_1$ according to the Equation v.

6. The $\delta_u$-mechanism

A feeler arm 127 pivoted on a shaft 128 carried in bearings in the base of the instrument, contacts the surface of the $\delta_u$ cam 92 thus getting an angular displacement depending on $\varphi_a$ and Y. Said feeler arm 127 has a straight slot along which a pin 129 is slideable. Said pin is attached to a rack 130 which is mounted for endwise reciprocation in a rectangular hole in a slide 131. The slide 131 is in turn slideable at right angles to the direction of reciprocation of the rack 130 along a guide 132 attached to the base of the instrument. The slide 131 can be displaced along a guide 132 by a lever 221, pivoted to a pin 222 secured to the slide. A threaded shaft 133, parallel to said guide 132, is carried in bearings 134 and 135 in the base of the instrument and is rotated by means of a graduated knob 136 for setting the wind component $u$. Rotation of the shaft 133 axially displaces the follower 223 thereon which carries a finger engaged in a longitudinal slot in the lever 221, so that said lever is thus swung in proportion to rotation of the wind correction knob 136. A prolongation of the square shaft 63 on which the $q$ cam is mounted has a non-linear thread and a follower 224 which has a finger engaged in another longitudinal slot in the lever 221. In zero position ($u=0$) the lever 221 is perpendicular to the guide 132, and the pin 129 concentric to the shaft pivot 128. When $u$ is set, the follower 223 will move a distance proportional to $u$, and the slide 131 a distance proportional to $u$ and a factor depending on $q$. Furthermore the rack 130 will be displaced, in relation to the slide 131, a distance proportional to $u$, said factor depending on $q$ and a factor depending on the actual angle of the feeler arm 127. The thread for the follower 224 and the $\delta_u$ cam 92 are cut in such a way that said factors will be, respectively, $1/\sqrt{q}$ and $f_2$ in equation viii. Thus the displacement of the rack 130 will be proportional to the value $$uf_2/\sqrt{q}=uf_2\sqrt{2g/\gamma}/v$$

i. e. proportional to the angle $\delta_u$ in Equation viii if $\sqrt{\gamma}$ is considered as approximately constant. The rack 130 rotates a gear cylinder 138 on a shaft 137 so that said shaft gets an angular displacement which is also proportional to $\delta_u$.

7. The $\delta_c$-mechanism

A crank-like shaft 139, rotatable in bearings 140 and 141 in the base of the instrument, has at its eccentric end a feeler arm contacting the surface of the $\delta_c$ cam 94. The turning of said shaft 139 is transmitted to a slide 142, slideable along a guide 144 by reason of the fact that the underside of the slide is partly shaped as a rack and meshes with a gear wheel 143 on shaft 139. A rack 145 is endwise slideable in a rectangular hole in said slide 142 perpendicular to the guide 144. The rack 145 meshes with and is slideable axially along a gear cylinder 147. Said gear cylinder 147 is mounted on a shaft 148, carried in bearings 149 and 150 in the base of the instrument, and having a graduated knob 151 by means of which the drag coefficient $c$ of the bomb in question may be manually set.

Another slide 152 is slideable along the guide 144. Said slide is partly shaped as a rack which meshes with a gear wheel 153 attached to an extension of the square shaft 63. A rack 154 is slideable in a rectangular hole in the slide 152, perpendicular to the guide 144, and meshes with a gear cylinder 156 on a shaft 157 carried in bearings 158 and 159 in the base of the instrument. An arm 161, having a straight longitudinal slot, is pivotally mounted at one end on a pivot 160 in the base of the instrument. Along the slot in the arm pins 146 and 155 on the racks 145 and 154, respectively, are slideable. Said slot is so arranged that the center lines of the pins 146 and 155 and the shaft pivot 160 are always held in a straight line. When the arm 161 is parallel to the guide 144 the pins 146 and 155 are in positions which are hereinafter called their zero positions.

As described above the square shaft 63 together with the gear wheel 153 will be turned through an angle proportional to the value $q$. Furthermore the gear ratio between the gear wheel 153 and the rack of the slide 152 is so chosen that the distance between the centers of the pin 160 and the pin 155 in zero position is proportional to the value $q$ and the surface of the $\delta_c$ cam 94 is so shaped that the turning angle of the shaft 139 will be reciprocally proportional to the function $f_1$ depending on the value Y and $\varphi_a$ in the Equation vii. In addition the gear ratios are so chosen that the distance between the center of the pin 160 and the pin 146 in zero position is proportional to the value $$\frac{1}{f_1}$$

The distance which the pin 146 is displaced from its zero position, when setting the knob 151, is arranged to be proportional to the value $c$. It is evident that, as a result of the geometry of the device, the pin 155 will be displaced a distance from its zero position proportional to the value $\delta_c$ according to Equation vii and consequently the turning angle of the shaft 157 will also be proportional to the value last mentioned.

8. The $a$-mechanism

By means of a graduated knob 162 the gross weight of the aircraft has to be set manually. Said knob is attached to a shaft 163, carried in bearings 164 and 165 in the base of the instrument. A part of said shaft is threaded and is received in an internal thread in a slide 166, so that rotation of the knob 162 displaces the slide 166 along an extension of the guide 60. An arm 168 is pivoted on a shaft 167 in the base of the instrument and has a straight slot along which pins 171 and 172, attached to racks 169 and 170 respectively, are slideable. Each of said racks meshes with one of two gear cylinders 173 and 174 respectively. Said gear cylinders together with their shafts 175 and 176 respectively are carried in bearings 177, 178 and 179, 180 respectively. Said slides, racks, arm, gear cylinders and shafts function in the same way as those in the $\delta_c$-mechanism described above under 7. When the arm 168 is in a position in which it is parallel to the guide 60, the distance between the shaft pivot 167 and the pin 171 will be proportional to the value $q$ and the distance between said shaft pivot 167 and the pin 172 will be proportional to the value G or G/F.

The shaft 175, which is controlled by an accelerometer mechanism, turns in proportion to the acceleration $n$ of the aircraft. Said accelerometer mechanism comprises an arm 182, pivoted on a shaft 175 and carrying a weight 181 at its free end. To said arm 182 there is attached one end of a torsion spring 183, the other end of which is attached to a gear wheel 184. Said gear wheel is coaxial with and secured to said shaft 175 and meshes with a gear wheel 185 on the shaft of an electric motor 186. A contact arm 187 is attached to the arm 182 so as to engage either of two contacts 188 and 189 upon small movements of said arm 182. Said contacts 188 and 189 are attached to the base of the instrument and connected to the terminals 190 and 191 respectively of the motor 186. The third terminal 192 of the motor is connected to the negative terminal 211 of the source of current 212. The contact arm 187 is connected to the positive terminal 210 of said source of current.

When the acceleration $n$ of the aircraft is increasing, the weight 181 will be pressed down. As a result the contact arm 187 will engage the contact 188, whereby the motor 186 starts twisting the spring 183 in a direction to cause its torque to raise the weighted arm 181, breaking the circuit through the contact arm 187 and the contact 188. This course of events will be repeated as long as the acceleration is increasing. When the acceleration is decreasing the movements are reversed.

The torque of said spring, required to balance the weight 181 influenced by the acceleration forces during the pull-out will be proportional to the value $n$. According to the properties of the spring 183 the turning of the shaft 175 will also be proportional to the value $n$. The turning of the shaft 176, by the slide mechanism 61, 166—174, will thus be proportional to the value $(a-a_s)$ in Equation xiii.

9. The total calculator

Coaxially secured to the gear wheel 102 is a wheel 193 to the periphery of which a steel band 194 is attached. The shafts 124, 137, 157 and 176 each have a coaxially attached gear wheel 195, 196, 197 and 198 respectively, each one of the gear wheels meshing with a rack 199, 200, 201 and 202. Each of the racks is endwise slideable along its own guide 203, 204, 205 and 206, respectively, attached to the base of the instrument and parallel to each other. Each one of said four racks carries in bearings a rotatable wheel 207, 208, 209 and 213 respectively around which the steel band 194 is trained in zigzag. The steel band 194 also passes over an idler wheel 214, carried on a shaft secured to the base of the instrument, and also over a wheel 215, to which it is attached at a point on the periphery of the wheel. Said wheel 215 is rotatably mounted on an extension of the shaft pivot 104 of the gyroscope. From the wheel 215 the steel band runs to a draw spring 216, one end of which is hooked on to the end of the steel band and the other end to the base of the instrument.

It will be seen that the steel band 194 will move a distance equal to the peripherical displacement of the wheel 193 plus twice the algebraic sum of the displacements of the racks 199, 200, 201 and 202. As described above, the turning angles of the following shafts are proportional to the following values:

Shaft 95 to value $\varphi_a$,
Shaft 124 to value $\epsilon_1$,
Shaft 137 to value $\delta_u$,
Shaft 157 to value $\delta_c$ and
Shaft 176 to value $(a-a_s)$.

By the correct dimensioning and choice of directions of motion of the wheels 193 and 215 and the gear wheels 195, 196, 197 and 198 the turning angle of the wheel 215 can be made proportional to the value $\varphi_a - \epsilon_1 - \delta_u - \delta_c - a$. Attached to said wheel 215 there is a contact arm 217, which is engageable with a contact 218 attached to the gimbal 105 of the gyroscope. The contact arm 217 is electrically connected to one of the terminals of the bomb release mechanism 24, the other terminal of which is connected to the negative terminal 211 of source of current 212. Said bomb release mechanism is of such design that it releases the bomb 31 when there is a voltage difference between its terminals. The contact 218 is connected to a terminal 220 of the actuating button 23. Said actuating button is so designed that the terminal 220 is connected to another terminal 219 when the button is pressed and the terminal 219 is connected to the positive terminal 210 of the source of current 212.

As described in connection with the $\varphi$-apparatus under section 4 above, the angular movement of the gimbal 105 is equal to $\overline{\varphi}$ measured from the caged position. Furthermore the wheel 215 has such a diameter, and the fastening angle between the contact arm 217 and the steel band 194 is so chosen, that the angular difference between the contact surfaces of the contact arm 217 and the contact 218 during their movements around the axis of said shaft pivot 104 is equal to the angle $\beta = \overline{\varphi} - \varphi_a + a + \epsilon_1 + \delta_c + \delta_u$ according to Equation xv.

10. The application of the bombing instrument shown in Fig. 9

After setting of the knobs 25, 162, 151 and 136 and the proper uncaging of the gyroscope with the knob 109 the bomb-aimer-pilot has to aim at the target with the optical axis 20 of the sight, provided that the attack is made parallel to the wind direction. When the aiming is satisfactory, he presses the actuating button 23 and starts the pull-out straight forwards and with the wing tips level. During the pull-out, due to the movements of the contact arm 217 and the contact 218 in relation to each other, said angle $\beta$ between the contact surfaces will decrease and the contacts engage when $\beta=0$. At that moment the bomb release mechanism 24 will be energized and the bomb 31 released.

After the release the bomb-aimer-pilot has to stop pressing the button 23, which returns to its rest position. It will be seen from the description above that the three-dimensional cams 92, 93 and 94 will immediately start again to follow the movements of the gyroscope gimbal 105, and so the instrument is ready for a new bombing attack.

If the attack is not made parallel to the wind direction the aiming can be made towards a point laterally displaced in relation to the target a distance equal to the side wind component multiplied by the time of fall. This can be made by means of judgement.

The Figure 10 embodiment

Fig. 10 shows an alternative design of a portion of the bombing instrument according to the invention shown in Fig. 9 and corresponding to that diagrammed in Fig. 5. The parts #193–209, 213–218 in Fig. 9 are replaced by 225–251 in Fig.

10. The principal difference between the alternatives is the fact that a second gyroscope is added in Fig. 10, measuring the angle of pull-out $\Delta$ and that the first gyroscope only measures the angle of dive $\phi_a$.

According to Equation xiv the Equation xv can be written.

$$\beta = \epsilon_l + \delta_u + \delta_c + a - \Delta \quad \text{(xvi)}$$

For the measuring of the angle $\phi_a$, needed only for the terms $\epsilon_l$, $\delta_u$ and $\delta_c$ in Equation xvi, there is a gyroscope 105—106 with a caging device, designed in the same manner as described above in relation to Fig. 9. Thus, the turning angle of the three-dimensional cams 92, 93 and 94 is controlled by means of said gyroscope.

A wheel 225 is coaxially attached to the shaft 176, which, as described above in relation to Fig. 9, turns through an angle proportional to the value $a$. Gear wheels 226, 227 and 228 are attached to the shafts 124, 137 and 157 respectively and each of said gear wheels meshes with a rack 229, 230 and 231 respectively, each of said racks being slideable along a guide 232, 233 and 234 respectively fixed in the base of the instrument. Each of said racks 229, 230 and 231 carries a freely rotatable wheel 235, 236 and 237 respectively. Referring to the description of the Fig. 9 embodiment above, it will be seen that said wheels will be displaced a distance proportional to $\epsilon_l$, $\delta_u$ and $\delta_c$ respectively. Attached to the periphery of the wheel 225 there is a steel band 238 running in zigzag around the wheels 237, 236 and 235, and then around two wheels 239 and 240, rotatable on journals fixed in the base of the instrument and around the wheel 241, journaled on a pivot shaft 242. From said wheel 241, to which it is attached at a point, the steel band 238 continues to a tension spring 243, one end of which is hooked on to the end of the steel band 238 and the other end to the base of the instrument.

The gimbal 244 of a gyroscope is rotatably carried by coaxial pivot shafts 242 and 246 fixed in the base of the instrument and parallel to the pivot shafts 103 and 104 of the gyroscope 105—106. Said gimbal 244 carries the rotor casing 245, the arrangement being similar to that of the gyroscope 105—106. A funneled disk 249 is attached coaxially to the rotor casing 245. A pin 248 is endwise pressed against said disk 249 by a spring (not shown in the figure), thereby caging the gyroscope. The pin is actuated by a solenoid 247 which withdraws it from the disk 249, thus uncaging the gyroscope, when the solenoid is energized. The terminals of the solenoid are connected to the actuating button 23 and the source of current 212 in such a manner that the solenoid will be energized when the actuating button 23 is pressed. It will be seen that the angular movement of the gimbal 244 will be equal to the angle $\Delta$, measured from the caged position of the gyroscope. Attached to the gimbal 244 is a contact arm 250, which can engage another contact arm 251, attached to the wheel 241.

In a manner similar to that described for the bombing instrument shown in Fig. 9 the angular difference between the contact surfaces of the contact arms as they move around the axis of said shaft 242 is arranged to be equal to the angle $\epsilon_l + \delta_u + \delta_c + a - \Delta = \beta$ according to Equation xvi. In a similar way as described above with reference to Fig. 9 the contact arms 250 and 251 close a circuit through a bomb release mechanism 24, when the actuating button 23 is pressed and the angle $\beta$ is equal to zero. The manner of using the bombing instrument shown in Fig. 10 is exactly the same as that of the bombing instrument shown in Fig. 9. In addition to the above mentioned embodiments of the bombing instrument the invention contemplates several other variations. For instance, certain simplifications of the instrument shown in Figs. 9 and 10 are possible, the price of which, however, is a reduction of the degree of accuracy of the instrument, or a limitation of its range of application.

One simplification is to replace the $\delta_u$-mechanism which includes the three dimensional $\delta_u$ cam 92 by extending the shaft 137 to the outside of the instrument and setting the wind speed directly on said shaft by means of a knob. This simplification is based on the assumption that the function $f_2$ in Equation viii is constant which is approximately true under certain conditions.

A second simplification is to eliminate the entire $\delta_c$-mechanism which includes the three-dimensional $\delta_c$ cam 94 by assuming the value $c$ as constant in Equation vii and standardizing the value $q$ as a function of the value Y and $\varphi_a$, the latter approximation being possible, due to the fact that the percentage variations of $q$ from normal values are small. Thus the value $\delta_c$ in Equation vii will only be dependent on the values Y and $\varphi_a$ and is apt to be included in the value $\epsilon_l$ by modifying the $\epsilon_l$ cam 93. It will be understood that the simplification indicated would limit the types of bombs which might be used with the apparatus.

A third simplification of the instrument is possible, due to the fact that the influence of the value $p$ in Equation xii is small, whereby the three-dimensional $q$ cam 69 can be replaced by a plain cam attached on the shaft 63, i. e. $q$ is put equal to a function of $q_c$ only ($p$ constant or standardized as a function of $q_c$).

A fourth simplification of the instrument is possible, due to the fact that the value $\gamma h$ in Equation xi can be taken as approximately equal to a function of the value $(p_0 - p)$, so that the three-dimensional $\gamma h$ cam 32 can be replaced by a plain cam on the shaft 33. In this case the screw 29 and the nut 30 have to be replaced by a device arranged to displace the pin 42 in a direction parallel to the spring 43 a distance proportional to the value $p_0$.

The gyroscope caging device 109—114 in Fig. 9 and Fig. 10 can be replaced or complemented by an automatic erection device for the purpose of erecting the gyroscope rotor axis to vertical position and keeping it there. There are several types of such devices known in the art.

The embodiments of the bombing instrument shown in Fig. 9 and Fig. 10 have, as described above, several reversible electric motors for the purpose of servo-operating the various mechanisms.

Many other types of servo-systems are well understood in the art and several of them are suitable for the purpose.

The instrumentalities for the manual settings are shown as knobs in Fig. 9 and Fig. 10. However, in many cases it is more convenient to replace said knobs by devices for remote control of the settings in question. In that case the settings have to be carried out on an auxiliary control unit, as shown in Fig. 8 and no settings need to be made directly on the main unit of the instrument. Of devices for remote control there are many known in the art.

Fig. 11 shows an embodiment of the invention in which the measuring of the elements of aim is partly done by radar equipment. The purpose of the radar equipment is to measure the slant range to the target during the dive before the pull-out and also the rate of change of the slant range. It will be recognized that by measuring the slant range the radar equipment uses the only distance, other than altitude, which can be employed in known practice to determine the position in space of the aircraft relative to the target at the instant the pilot initiates automatic operation of the instrument. The design of such radar equipment is well understood in the art.

Let $s = \dfrac{h}{\sin \varphi_a} =$ the slant range = the distance between the aircraft and the target $\dfrac{ds}{dt} =$ the rate of change of the slant range ($t$ = time, $\dfrac{ds}{dt} = v$ in the case of $u=0$)

In addition to these symbols and those previously used, the index "$a$" will denote the value immediately before the pull-out.

If the simplification is assumed, that the quantity $cq$ is standardized as normally being a function of the variables $\varphi_a$ and $Y$, said function being obtained from flight tests, the angle of divergence can be deduced as a function of the variables $\varphi_a$ and $Y$ or (approximately) $\varphi_a$ and $Y_a$ only.

Hence $$\epsilon = f_3(\varphi_a, Z_a) \quad \text{(xvii)}$$

where $$Z_a = Y_a / \sin \varphi_a = \dfrac{2gh_a}{v_a^2 \sin \varphi_a} = \dfrac{2gs_a}{(ds/dt)_a^2} \quad \text{(xviii)}$$

and $f_3$ is a definite function of $\varphi_a$ and $Z_a$.

The embodiment of the invention shown in Fig. 8 is based on the following equation, derived from Equations iii and xiv above $$\beta = \overline{\varphi} - \varphi_a + \epsilon + \alpha \quad \text{(xix)}$$

in which $\epsilon$ is set equal to the function $f_3$ in Equation xvii. The following pattern is used.

*Quantities in the instrument*

I Manually set:

No quantities.

II Measured in the instrument:

| Quantities | $s_a$, $(ds/dt)_a$ | $\varphi_a$, $\overline{\varphi}$ | $\alpha$ |
|---|---|---|---|
| Measured by | radar | gyroscope | angle of incidence meter. |

III Calculated in the instrument by calculating mechanisms:

| Quantities | $Z_a$ | $\epsilon$ | $\beta$ |
|---|---|---|---|
| According to equation | xviii | xvii | xix |

The bombing instrument according to the invention shown in Fig. 11, which has to be installed in the aircraft with its axes related to the flight direction as shown, will now be described more in detail.

The radar equipment, the design of which is outside the scope of this invention, is shown as a unit 290 connected to the radar antenna 291 arranged to transmit radiation in the flight direction and pick up reflected energy. When energized by the source of current 212 of the aircraft, the equipment will measure the slant range $s$ and its rate of change $ds/dt$, if the aircraft is diving towards the target. Furthermore, the unit 290 is designed in such a way that an output shaft 252 turns through an angle proportional to the value $s$ and another output shaft 253 through an angle proportional to the value $ds/dt$.

The movement of the shaft 252 is transmitted to a slide 254 by means of a gear wheel 255 and a rack attached to said slide. Hence a pin 256 attached to the slide 254 will move a distance from the zero position 257 proportional to the slant range $s$. The movement of the shaft 253 is transferred to a slide 258 by means of two gear wheels 259 and 260 and a square-pitched screw 261, so that a pin 262 attached to the slide 258 will move a distance from the zero position 257 proportional to the square of the rate of change $ds/dt$.

The slides 254 and 258 move along two guides 263 and 264, respectively, arranged at right angles to one another. In a manner similar to that described in connection with Fig. 9 (section 3, the Y-mechanism), a three-dimensional cam 265 will be moved axially a distance which depends upon the value $Z = 2gs/(ds/dt)^2$ by means of a gear sector arm 266 meshing with a gear cylinder 267 which in turn actuates a rack 268. In contact with said cam 265 there is a feeler arm 269, the turning angle of which is fed into a total calculator designed in principle like that of Fig. 9, and comprising a band 270, band wheels 271, 278, 279, 280 and 281, drive gear 293, gear wheels 272 and 273, racks 274 and 275, guides 276 and 277, a tension spring 282 and a contact arm 283 which engages with contact 294 carried by the gimble 292 of gyroscope 284.

Into the total calculator the angles $\varphi_a$ and $\overline{\varphi}$ are also fed as determined by a $\varphi$-apparatus comprising a gyroscope 284 and a follow-up mechanism. The $\varphi$-apparatus is similar to that of Fig. 9, except that there is no manually operated caging device, the gyroscope 284 being erected by a built-in automatic erecting device designed in a manner known in the art.

Into the total calculator the angle of attack $\alpha$ is also fed by means of a shaft 285, which is turned by a vane 286 located in the free air stream outside the aircraft.

The instrument is electrically connected to the source of current 212, the actuating button 23, and the bomb release mechanism 24 of the aircraft, in the same manner as shown in Fig. 9 as regards corresponding members. The connection between the source of current and the radar unit 290 for energizing of the latter, however, is arranged in such a way that the current flow is interrupted when the actuating button 23 is pressed. Hence the values $s_a$, $(ds/dt)_a$ and $Z_a$ will be kept by the instrument during the pullout. The turning angle of the feeler arm 269 therefore will depend on the variables $\varphi_a$ and $Z_a$, and is obtained $=\epsilon$ in accordance with Equation xvii by giving the three-dimensional cam 265 a suitable form.

The operation of the total calculator is similar to that of Fig. 9, whereby a release impulse will be transmitted when Equation xix is satisfied. The application of the instrument is the same as for the instrument shown in Fig. 9 except that no manual settings are required.

In the description of the instrument with reference to Figs. 8–11 a fixed optical axis is assumed as the reference axis for the aiming of the aircraft and for the computing devices of the instrument. Of course, the instrument according to the invention can be used together with a bomb sight having a movable or adjustable optical axis. In that case another longitudinal axis, fixed in the aircraft, has to be used as the reference line for the instrument.

Under certain conditions the embodiment of the instrument shown in Figs. 9 and 10 can be used for the release of other missiles than bombs. Thus the instrument can be used for the release of rockets, in which case a negative value of the resistance factor c is to be set in the instrument.

From the foregoing description taken with the accompanying drawings it will be apparent to those skilled in the art that this invention not only assures optimum accuracy in dive bombing but, due to the technique and method of bombing made possible thereby, actually reduces the risk from antiaircraft fire during attacks; so that one airplane equipped with the invention can take the place of several bombers not so equipped.

We claim:

1. A bomb release instrument for use in aircraft having sighting means providing an optical axis fixable in parallelism with a fixed axis of the aircraft which is substantially parallel to the normal path of motion of the aircraft so that by maneuvering the aircraft said optical axis may be brought into coincidence with the line of sight from the aircraft to the target during a dive toward the target, said bomb release instrument comprising: manually operable control means for initiating the automatic functioning of the instrument so that when said optical axis has been brought into coincidence with the line of sight to the target the automatic operation of the instrument can be started; instrumentalities for producing an output which is a function of the speed of the aircraft, a distance which is related to the position in space of the aircraft with respect to the target, and the angle between said axis of the aircraft and the horizontal at the instant the automatic functioning of the instrument is initiated by the actuation of said manually operable control means; instrumentalities for ascertaining the changing slope of said axis of the aircraft during a straight-way pull-out after a dive and for producing an output which is a function of said changing slope; and control instrumentalities connected with said first and second named instrumentalities and responsive to the differential of their outputs, said control instrumentalities including a release impulse device for actuating a bomb release when said differential attains a predetermined value.

2. The bomb release instrument of claim 1 further characterized by the provision of: apparatus for producing an output which is a function of the aerodynamic angle of attack of the aircraft and for imposing said output upon the differential of the outputs of said first two instrumentalities to thereby modify said differential in accordance with variations in the aerodynamic angle of attack during the pull-out.

3. The bomb release instrument of claim 2 wherein said apparatus for producing an output which is a function of the aerodynamic angle of attack comprises an accelerometer for measuring the acceleration of the aircraft during the pull-out and an aneroid responsive to a function of the speed of the aircraft during the pull-out.

4. The bomb release instrument of claim 1 wherein those of said first named instrumentalities which are responsive to the effects of the speed of the aircraft and said distance which is related to the position in space of the aircraft with respect to the target are radar controlled.

5. A bomb release instrument for use in aircraft having sighting means providing an optical axis fixable in parallelism with a fixed axis of the aircraft which is substantially parallel to the normal path of motion of the aircraft so that by maneuvering the aircraft said optical axis may be brought into coincidence with the line of sight from the aircraft to a target during a dive toward the target, said bomb release instrument being operable to automatically release a bomb during the vertical change of direction of the aircraft in a straight-away pull-out after a dive, and comprising: manually operable control means for initiating the automatic functioning of the instrument so that when said optical axis has been brought into coincidence with the line of sight to the target the automatic operation of the instrument can be started; instrumentalities including speed measuring means for producing an output proportional to a predetermined function of the speed of the aircraft; instrumentalities including altitude measuring means for producing an output proportional to a predetermined function of the altitude of the aircraft above the target; instrumentalities for ascertaining the angle between said axis of the aircraft and the horizontal at the instant when said manually operable control means is actuated and for producing an output proportional to a function of that angle; integrating apparatus responsive to the outputs of said last three named instrumentalities for producing an output proportional to a function of said three outputs, instrumentalities for ascertaining the changing slope of said axis of the aircraft during a straight-away pull-out after a dive and for producing an output proportional to a function of said changing slope; and control means connected with said integrating apparatus and said last named instrumentalities and responsive to the differential of their outputs, said control means including a release impulse device for energizing a bomb release when said differential attains a predetermined value.

6. A bomb release instrument for use in aircraft adapted for dive bombing, said instrument being operable upon manual initiation of actuation thereof to release a bomb during the pull-out from a dive when the relationship between the elements of aim is such that a bomb then released will hit the target, characterized by: a three-dimensional cam mounted for rotary movement about an axis passing therethrough and for translatory movement along said axis; means responsive to the speed of the aircraft for producing an output which is a function of said speed, means responsive to a distance related to the position in space of the aircraft with respect to the target for producing an output which is a function of said distance; instrumentalities responsive to said two outputs for producing a third output which is a quotient function of said first two outputs; means for coupling said instrumentalities with the cam for effecting one of its two movements; gyro means for effecting the other of said two movements of the cam in proportion to the dive angle of the aircraft at the instant actuation of the instrument is initiated; a cam follower in contacting engagement with the cam to produce an output proportional to a function of the speed, said distance and the dive angle of the aircraft; instrumentalities for ascertaining the changing slope of the longitudinal axis of the aircraft during a straight-away pull-out after a dive and for producing an output proportional to a function of said changing slope; and control means connected with the cam follower and said last named instrumentalities and responsive to the differential of their outputs; said control means including a release impulse device for energizing a bomb release when said differential attains a predetermined value.

7. In an aircraft adapted for dive bombing and having means providing an optical axis fixable in parallelism with a fixed axis of the aircraft which is substantially parallel to the normal path of motion of the aircraft so that by maneuvering the aircraft said optical axis may be brought into coincidence with the line of sight from the aircraft to the target during a dive toward the target, an automatic bomb release instrument comprising: manually operable control means for initiating the automatic functioning of the instrument so that when said optical axis has been brought into coincidence with the line of sight to the target the automatic operation of the instrument can be started; instrumentalities for producing an output which is a function of the speed of the aircraft, a distance which is related to the position in space of the aircraft with respect to the target, and the angle between said axis of the aircraft and the horizontal at the instant the automatic functioning of the instrument is initiated by the actuation of said manually operable control means; instrumentalities for ascertaining the changing slope of said axis of the aircraft during a straight-away pull-out after a dive and for producing an output which is a function of said changing slope; and control instrumentalities connected with said first and second named instrumentalities and responsive to the differential of their outputs, said control instrumentalities including a release impulse device for actuating a bomb release when said differential attains a predetermined value.

8. A bomb release instrument for use in aircraft having sighting means providing an optical axis fixable in parallelism with a fixed axis of the aircraft which is substantially parallel to the normal path of motion of the aircraft so that by maneuvering the aircraft said optical axis may be brought into coincidence with the line of sight from the aircraft to the target during a dive toward the target, said bomb release instrument comprising: manually operable control means for initiating the automatic functioning of the instrument so that when said optical axis has been brought into coincidence with the line of sight of the target the automatic operation of the instrument can be started; instrumentalities for producing an output which is a function of the speed of the aircraft and a distance which is related to the position in space of the aircraft with respect to the target; gyroscope means for ascertaining the angle between said axis of the aircraft and the horizontal at the instant the automatic functioning of the instrument is initiated by the actuation of said manually operable control means and producing an output which is a function of said angle; integrating means for combining the said two outputs into a resultant output; gyroscope means for ascertaining the changing slope of said axis of the aircraft during a straight-away pull-out after the initiation of the actuation of the instrument for producing an output which is a function of the changing slope; and control instrumentalities responsive to the differential between said resultant output and said changing slope output, said control instrumentalities including a release impulse device for actuating a bomb release when said differential attains a predetermined value.

9. The bomb release instrument of claim 8 further characterized by means, including an accelerometer, for producing an output proportional to the aerodynamic angle of attack of the aircraft and for imposing said output upon said control instrumentalities to modify said differential in accordance with variations in the aerodynamic angle of attack during the pull-out.

10. The bomb release instrument of claim 8 further characterized by the fact that said control instrumentalities comprise a contact actuated by the gyroscope means for ascertaining the changing slope angle and a second contact actuated by said integrating means in accordance with said resultant output, both said contacts being in circuit with the bomb release impulse device and operable upon engagement with one another to complete the circuit to effect release of a bomb.

ERIK ALVAR WILKENSON.
PER TORSTEN FAXÉN.

REFERENCES CITED

The following references are of record in the file of this patent:

UNITED STATES PATENTS

| Number | Name | Date |
|---|---|---|
| 2,409,648 | Van Auken et al. | Oct. 22, 1946 |
| 2,423,831 | Garbarini et al. | July 15, 1947 |
| 2,445,335 | Philbrick et al. | July 20, 1948 |
| 2,454,009 | Sanders | Nov. 16, 1948 |
| 2,529,324 | Blackett et al. | Nov. 7, 1950 |